(12) United States Patent
d'Abreu et al.

(10) Patent No.: US 8,484,542 B2
(45) Date of Patent: Jul. 9, 2013

(54) DATA RECOVERY USING ADDITIONAL ERROR CORRECTION CODING DATA

(75) Inventors: Manuel Antonio d'Abreu, El Dorado Hills, CA (US); Stephen Skala, Fremont, CA (US)

(73) Assignee: Sandisk Technologies Inc., Plano, TX (US)

( * ) Notice: Subject to any disclaimer, the term of this patent is extended or adjusted under 35 U.S.C. 154(b) by 322 days.

(21) Appl. No.: 13/023,147

(22) Filed: Feb. 8, 2011

(65) Prior Publication Data

US 2012/0204077 A1 Aug. 9, 2012

(51) Int. Cl.
*H03M 13/00* (2006.01)

(52) U.S. Cl.
USPC .......................................... 714/785; 714/763

(58) Field of Classification Search
USPC .................................. 714/763, 785
See application file for complete search history.

(56) References Cited

U.S. PATENT DOCUMENTS

| | | | | |
|---|---|---|---|---|
| 5,901,159 A * | 5/1999 | Ichikawa | | 714/765 |
| 6,092,231 A * | 7/2000 | Sze | | 714/758 |
| 6,651,212 B1 | 11/2003 | Katayama et al. | | |
| 7,171,591 B2 | 1/2007 | Chen | | |
| 7,173,852 B2 | 2/2007 | Gorobets et al. | | |
| 7,518,919 B2 * | 4/2009 | Gonzalez et al. | | 365/185.11 |
| 7,849,381 B2 * | 12/2010 | Tomlin | | 714/763 |
| 7,958,427 B1 * | 6/2011 | Yeung et al. | | 714/755 |
| 8,095,851 B2 * | 1/2012 | Diggs et al. | | 714/763 |
| 8,136,008 B1 * | 3/2012 | Yeung et al. | | 714/755 |
| 8,245,101 B2 * | 8/2012 | Olbrich et al. | | 714/753 |
| 2005/0091569 A1 | 4/2005 | Chao | | |
| 2007/0157064 A1 | 7/2007 | Falik et al. | | |
| 2008/0168319 A1 | 7/2008 | Lee et al. | | |
| 2008/0256420 A1 | 10/2008 | Hafner et al. | | |
| 2009/0013233 A1 | 1/2009 | Radke | | |
| 2009/0292970 A1 | 11/2009 | Man et al. | | |

OTHER PUBLICATIONS

The International Search Report and Written Opinion mailed Apr. 23, 2012 in International Application No. PCT/US2012/023735, 11 pages.

* cited by examiner

*Primary Examiner* — Esaw Abraham
(74) *Attorney, Agent, or Firm* — Toler Law Group, PC

(57) ABSTRACT

A method in a data storage device receiving data including a data block and main error correction coding (ECC) data for the data block. The data block includes a first sub-block of data and a second sub-block of data. The method also includes initiating an ECC operation to process the data block using the main ECC data. In response to the ECC operation indicating uncorrectable errors in the data block, first additional ECC data that is external to the data block is retrieved and a second ECC operation is initiated to process the first sub-block of data using the first additional ECC data.

29 Claims, 5 Drawing Sheets

DATA RECOVERY USING ADDITIONAL ERROR CORRECTION CODING DATA

FIELD OF THE DISCLOSURE

The present disclosure is generally related to data recovery.

BACKGROUND

The capability to store data in memory devices continually improves with advances in technology. For example, flash memory enables non-volatile storage of data with a storage density that can be enhanced by storing multiple data bits per memory cell. However, data written to a memory may be unintentionally altered due to physical conditions of the memory, such as thermal noise, cosmic rays, or damage to physical components of the memory. Error correction coding (ECC) schemes are often used to correct errors that may occur in data. Such ECC schemes typically include encoding the data using redundant information, providing robust recovery from errors but also increasing manufacturing cost and reducing data storage density of the memory device.

An ECC scheme selected to provide error correction capability for an expected range of operating conditions of a memory device may be insufficient to correct errors generated by conditions encountered during fabrication. For example, content may be pre-loaded into a memory device prior to attaching the memory device to a printed circuit board (PCB). Attaching the memory device to the PCB may include polishing, reflow, or other processes. Errors occurring to the pre-loaded data during such processes may exceed the error correction capability of the ECC scheme. Errors may occur in the pre-loaded data as a result of one or more other processes. For example, some memory devices may experience degradation of stored data based on a length of time the data is stored in the device.

SUMMARY

Enhanced error correction is provided to data blocks by providing additional ECC data that is external to the data blocks and that corresponds to sub-blocks of the data blocks. If a data block and main parity for the data block have too many errors to be corrected using the main parity, one or more sub-blocks may be individually corrected using the additional ECC data. The additional ECC data can include additional parity dedicated to a single sub-block to enable correction of a greater number of errors in the sub-block than are correctable using the main parity.

The additional ECC data may be provided in a data storage device to enable additional protection of pre-loaded content that may be corrupted during a polishing or reflow process. A data correction procedure may be performed to restore corrupted pre-loaded content using the additional ECC data as needed. After restoring the pre-loaded content, memory locations storing the additional ECC data may retain the additional ECC data or optionally may be freed to increase available space in the memory.

DETAILED DESCRIPTION

Figure 1:
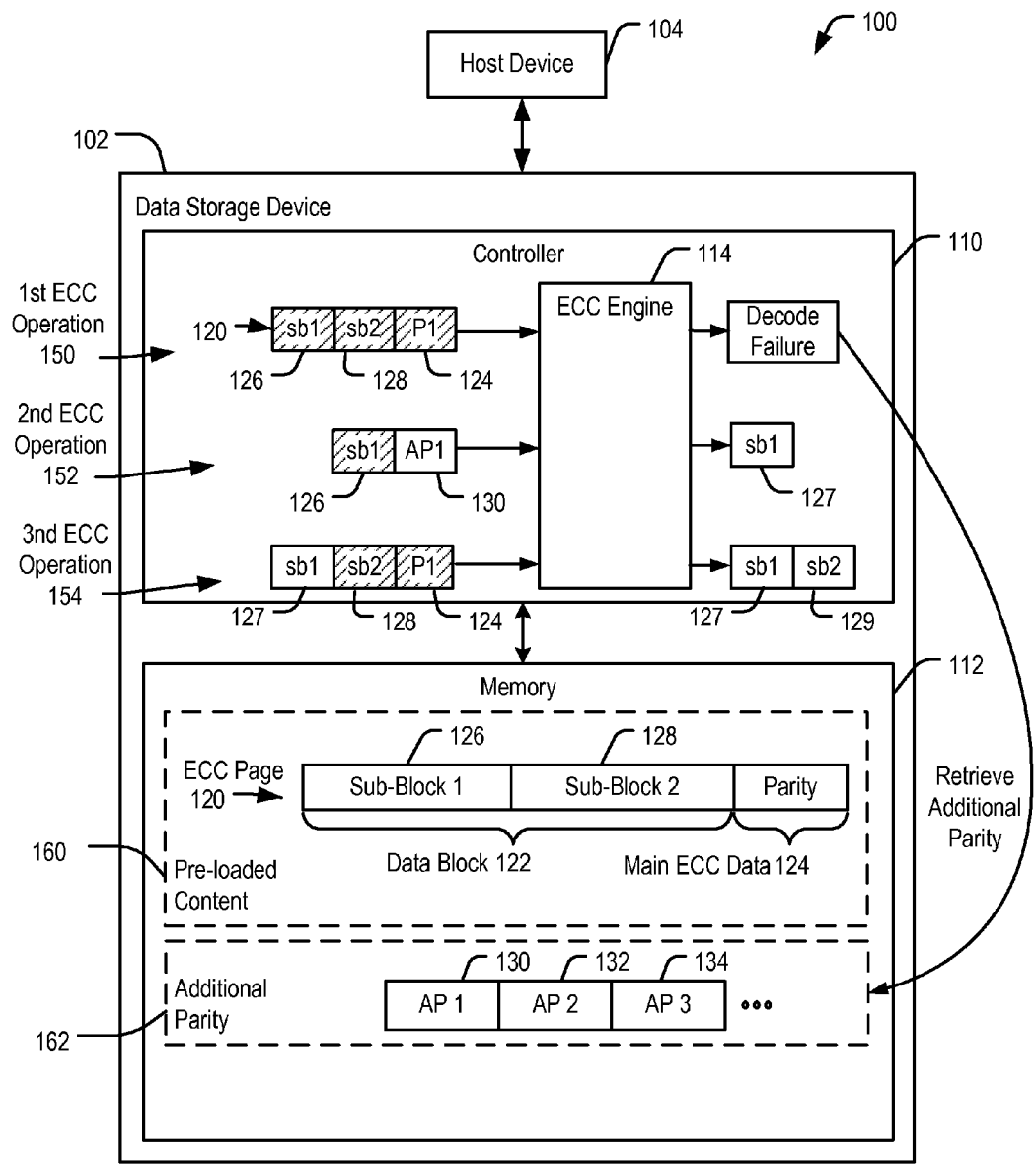
FIG. 1 is a block diagram of a particular illustrative embodiment of a system to provide data recovery using additional error correction coding (ECC) data.

Referring to FIG. 1, a system that stores additional parity to enable recovery of data is depicted and generally designated 100. The system 100 includes a data storage device 102 that may be operatively coupled to a host device 104. The data storage device 102 includes a memory 112 that stores additional parity to enable correction of data that is corrupted beyond an error correction capability of a main ECC encoding scheme.

The host device 104 may be configured to provide data to be stored at the data storage device 102 or to request data to be read from the data storage device 102. For example, the host device 104 may include a mobile telephone, a music or video player, a gaming console, an electronic book reader, a personal digital assistant (PDA), a computer such as a laptop computer or notebook computer, any other electronic device, or any combination thereof.

The data storage device 102 includes a controller 110 coupled to the memory 112. To illustrate, the data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be configured to be coupled to the host device 104 as embedded memory, such as eMMC® (trademark of JEDEC Solid State Technology Association, Arlington, Va.) and eSD, as illustrative examples. As another illustrative example, the data storage device 102 may include a hard disk drive that includes one or more rotating platters for data storage.

The memory 112 may include a non-volatile memory device, such as a flash memory. The data storage device 102 may be one of a flash memory card, a universal serial bus (USB), a flash drive, a solid state drive (SSD), and an embedded flash memory. As another example, the memory 112 may be a three-dimensional (3D) memory. The data storage device 102 may be configured to be coupled to the host device 104 as an embedded memory. Alternatively, the data storage device 102 may be configured to be removably coupled to the host device 104, such as a memory card or USB flash drive (UFD). In some implementations, the data storage device 102 may be a hard drive or other type of storage device.

The controller 110 includes an error correction coding (ECC) engine 114. The ECC engine 114 is configured to receive coded data that may include user data and parity bits and to decode the encoded data after a corrupting event, such as a reflow event that may cause corruption to data stored at the memory 112.

The memory 112 may include a pre-loaded content area 160 and an additional parity area 162. Pre-loaded content may include data that is stored at the memory 112 by a manufacturer of the memory 112 or of the data storage device 102. For example, the pre-loaded content may be stored in the memory 112 before the memory 112 is attached to a printed circuit board (PCB). Attachment of the memory 112 to the PCB can include a reflow event, such as a solder, infra-red (IR), or other reflow type, that may expose the memory 112 to an elevated temperature. As a result, the pre-loaded content stored in the memory 112 may experience error rates higher than error rates typically experienced during normal operation.

An ECC page 120 is illustrated as a representative unit of content storage. The representative ECC page 120 includes a data block 122 and main ECC data 124. For example, the data block 122 may include data that has been stored at the memory 112 and the main ECC data 124 may include parity bits that have been generated using an error correction coding to form the ECC page 120. The parity bit of the main ECC data 124 may be used by the ECC engine 114 to enable detection and correction of one or more errors occurring in the ECC page 120.

The additional parity area 162 may include additional parity bits corresponding to data stored in the memory 112, such as data in the pre-loaded content area 160. As illustrated, the additional parity area 162 includes first additional ECC data 130, second additional ECC data 132, and third additional ECC data 134. Each of the additional ECC data 130-134 may correspond to a portion of a data block in the pre-loaded content area 160. For example, the first additional ECC data 130 may include first additional parity (AP) bits that provide redundancy for a first sub-block 126 of the data block 122. To illustrate, the first additional ECC data 130 may be generated by encoding only the first sub-block 126 (i.e., without a second sub-block 128) to generate a code word. The parity included in the generated code word may be stored as the first additional ECC data 130 and may enable detection and correction of errors when combined with the first sub-block 126 and provided to the ECC engine 114. Similarly, the second additional ECC data 132 may be usable by the ECC engine 114 to correct errors in another single sub-block of multiple sub-blocks within the data block 122. For example, the second additional ECC data 132 may be usable by the ECC engine 114 to perform error correction for the second sub-block 128.

Because the additional ECC data, such as the first additional ECC data 130, may provide error recovery for a single sub-block rather than for an entire data block, an error correction capability to correct errors within the sub-block may be enhanced as compared to an error correction capability of the main ECC data 124. To illustrate, an error correction capability using the main ECC data 124 may be exceeded by a number of errors occurring in the first sub-block 126 and the second sub-block 128 combined, while an error correction capability using the first additional ECC data 130 (e.g. using additional parity) may not be exceeded when applied to the first sub-block 126 alone.

The controller 110 may be configured to initiate a first ECC operation 150 at the ECC engine 114 to process a data block, such as the data block 122, using main ECC data for the data block, such as the main ECC data 124. Each of the sub-blocks 126 and 128 and the main ECC data 124 may include errors, illustrated in FIG. 1 as hatched blocks of data. In response to the first ECC operation 150 indicating uncorrectable errors in the data block 122, illustrated as a decode failure indication 156, the controller 110 may be configured to retrieve first additional ECC data that is external to the data block 122 from the memory 112. For example, the controller 110 may retrieve the first additional ECC data 130 from the additional parity area 162 of the memory 112.

The controller 110 may be configured to process the first sub-block 126 of the data block 122 using the first additional ECC data 130 in a second ECC operation 152. As illustrated, the second ECC operation 152 may result in a correction of errors occurring in the first sub-block 126, resulting in an error corrected version of the first sub-block 127.

After successfully decoding the first sub-block 126 to generate the error corrected first sub-block 127, the controller 110 may be configured to initiate a third ECC operation 154 at the ECC engine 114. The third ECC operation 154 may be performed using the error corrected first sub-block 127, in addition to the second sub-block 128 and the main ECC data 124 originally retrieved from the memory 112. Because a portion of the data has been error corrected, a total number of errors in the ECC page may be reduced and may fall within the error correction capability of the ECC engine 114 using the main ECC data 124. As a result, the third ECC operation 154 may produce an error-corrected data block including the first error corrected sub-block 127 and an error-corrected second sub-block 129.

Although FIG. 1 illustrates performing a single ECC operation using additional parity (i.e., in the second ECC operation 152), the controller 110 may be configured to perform multiple secondary ECC operations, each of the secondary ECC operations configured to decode other sub-blocks of the data block 122 using other additional parity blocks. To illustrate, when the second additional ECC data 132 corresponds to the second sub-block 128, the second ECC operation 152 may be followed by another ECC operation to correct the second sub-block 128 using the second additional ECC data 132. Sequential processing of sub-blocks may continue until all sub-blocks of the ECC page 120 have been separately processed using additional ECC data. Following processing of the sub-blocks, the third ECC operation 154 using the main ECC data 124 may be bypassed because all errors may have been detected and corrected in the individual sub-blocks.

In another implementation, after the third ECC operation 154 is performed and a determination is made that the second sub-block 128 and the remaining ECC data 124 continue to have a number of errors exceeding the error correction capability of the ECC engine 114 using the main ECC data 124, one or more additional ECC operations using additional parity may be performed. For example, after receiving an indication that there are uncorrectable errors in the data block 122 during the third ECC operation 154, a fourth ECC operation may be initiated by the controller 110 to decode the second sub-block 128 using the second additional ECC data 132.

Although FIG. 1 illustrates a single representative ECC page 120 in the pre-loaded content area 160, it should be understood that multiple ECC pages of pre-loaded content may be included in the memory 112. In addition, although the additional parity area 162 is illustrated as including the representative additional ECC data 130-134, it should be understood that a sufficient amount of additional ECC data may be stored in the memory 112 to provide additional error correction capacity to pre-loaded content. Although the memory 112 is illustrated as having a single pre-loaded content area 160 and additional parity area 162, in other implementations the memory 112 may include multiple pre-loaded content areas, multiple additional parity areas, or a combination thereof.

By including content in the pre-loaded content area 160 and including additional parity to provide additional error correction capability for the pre-loaded content, data corruption that may occur during a reflow process, a polishing process, or another event may be recoverable even though an error correction capability using main ECC data is exceeded. Thus, as an example, after mounting the data storage device 102 to a printed circuit board within a mobile or electronic device, the controller 110 may initiate a data correction procedure that scans the pre-loaded content area 160, performs error correction, and re-stores the error corrected data to the memory 112. ECC pages that are determined to not be recoverable using the main ECC data may be corrected by initiating secondary ECC operations, such as the second ECC operation 152, where additional ECC data for each sub-block is retrieved to provide additional error correction capability and data recovery from the error causing event. An example of a data correction procedure is described in further detail with respect to FIG. 4.

Figure 2:
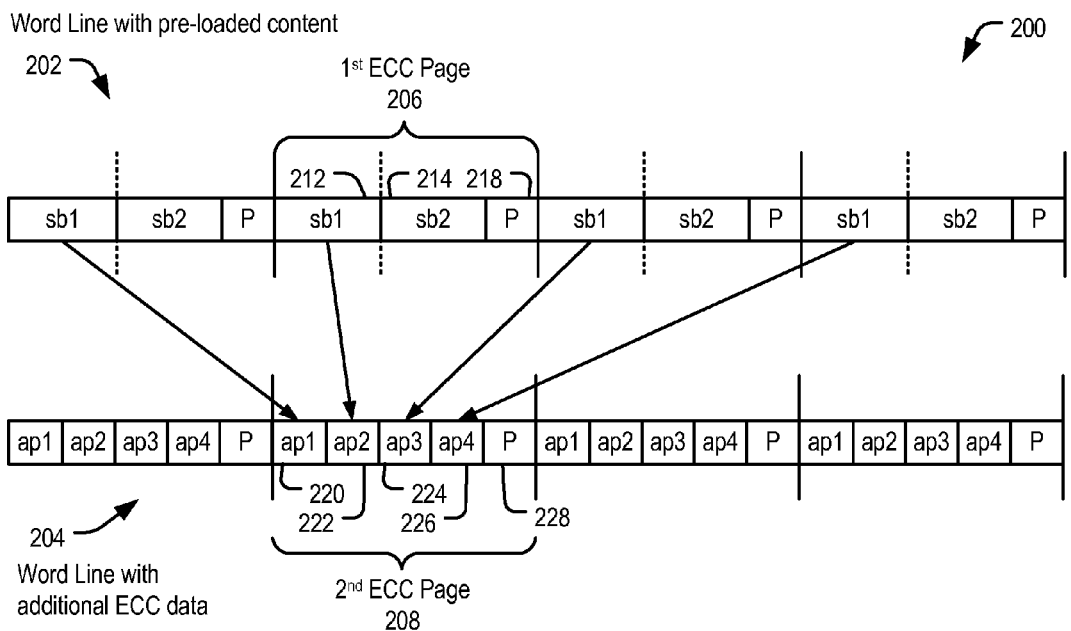
FIG. 2 is a general diagram of a first illustrative embodiment of pre-loaded content and additional ECC data stored at the memory 112 of FIG. 1.

FIG. 2 depicts a first illustrative embodiment 200 of a memory structure storing pre-loaded content and additional ECC data. A first word line 202 may include pre-loaded content, such as the pre-loaded content stored in the memory of 112 of FIG. 1. For example, the first word line 202 may include four ECC pages including a first representative ECC page 206. Each ECC page may include one or more sub-blocks, such as a first representative sub-block 212 and a second representative sub-block 214. Each ECC page may also include main ECC data, such as representative main ECC data 218 that includes parity bits for error correction of the first sub-block 212 and the second sub-block 214.

A second word line 204 stores additional ECC data. As illustrated, the second word line 204 includes multiple ECC pages including a representative second ECC page 208. Each of the ECC pages of the second word line 204 includes multiple blocks of additional ECC data (e.g. additional parity) that correspond to one or more sub-blocks of the first word line 202. As illustrated, the second representative ECC page 208 includes first additional ECC data 220, second additional ECC data 222, third additional ECC data 224, and fourth additional ECC data 226. The second ECC page 208 also includes main ECC data 228, which provides error correction capability for errors that may occur in any of the additional ECC data 220-226.

Each of the additional ECC data 220-226 corresponds to a sub-block of the pre-loaded content. For example, a first sub-block of each of the ECC pages of the first word line 202 may be individually encoded and the resulting additional parity stored in the second ECC page 208, in a manner as illustrated and described with respect to FIG. 1. The second ECC page 208 includes four sets of additional ECC data 220-226, and thus provides additional ECC data for the entire first word line 202. As such, the second word line 204 may provide additional ECC data for data recovery for a total of four word lines that store pre-loaded content.

In some implementations, one or more sub-blocks of the ECC pages of the first word line 202 do not have corresponding additional parity. For example, the second sub-block 214 may not be protected by additional ECC data. Although the main ECC data 218 may be insufficient to correct errors in the sub-blocks 212 and 214 combined, the main ECC data 218 may be sufficient to correct errors in the second sub-block 214 after the first sub-block 212 has been corrected using the second additional ECC data 222. In other implementations, all sub-blocks of an ECC page may be protected using additional ECC data, as described with respect to FIG. 3.

Figure 3:
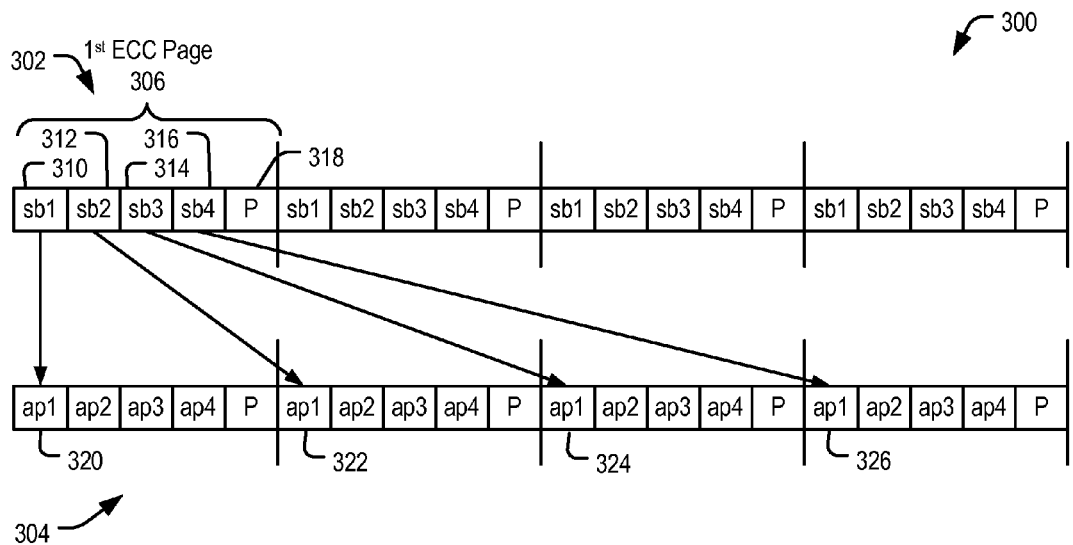
FIG. 3 is a general diagram of a second illustrative embodiment of pre-loaded data and additional ECC data stored at the memory 112 of FIG. 1.

FIG. 3 depicts another illustrative embodiment 300 of a memory structure storing pre-loaded content and additional ECC data for the pre-loaded content. A first word line 302 stores pre-loaded content in multiple ECC pages including a first representative ECC page 306. The first ECC page 306 includes four sub-blocks 310-316 and a main ECC data portion 318. A second word line 304 includes additional ECC data.

As illustrated, each ECC page of the second word line 304 includes four sub-blocks, with each sub-block including additional ECC data corresponding to pre-loaded content. A first sub-block 320 of a first page of the second word line 304 provides additional ECC data for the first sub-block 310. A first sub-block 322 of the second page of the second word line 304 provides additional ECC data for the second sub-block 312. A first sub-block 324 of a third ECC page of the second word line 304 provides additional ECC data for the third sub-block 314. A first sub-block 326 of a fourth ECC page of the second word line 304 provides additional ECC data for the fourth sub-block 316 of the first ECC page 306.

FIG. 3 illustrates that additional parity may be provided for individual sub-blocks of ECC pages having multiple sub-blocks of pre-loaded content. FIG. 3 also illustrates that additional ECC data for multiple sub-blocks of a single ECC page may be stored at separate distinct ECC pages of the additional ECC data. Further, it should be understood that the second word line 204 of FIG. 2 or the second word line 304 of FIG. 3, each storing additional ECC data to aid in the data recovery of pre-loaded content, may also be protected with additional ECC data.

For example, errors occurring in the second ECC page 208 of FIG. 2 may be correctable by applying an ECC operation using the main parity 228. If a number of errors occurring in the second ECC page 208 exceeds an error correction capability using the main parity 228, one or more of the sub-blocks containing the additional ECC data 220-226 may be provided to an ECC engine as a sub-block to be decoded using still further additional ECC parity stored in the memory in a manner similar to the second ECC operation 152 of FIG. 1. Therefore, additional word lines may be provided to include additional parity, to enable error recovery of additional parity, which in turn enables error recovery of pre-loaded data.

The main ECC data and the additional ECC data, such as the main ECC data 218 and the second additional ECC data 222 of FIG. 2, may include any type of ECC data. For example, the main ECC data 218 and the second additional ECC data 222 may include parity bits or other redundant information according to a Bose-Chaudhuri-Hocquenghem (BCH) encoding, a Reed-Solomon encoding, a low density parity check (LDPC) encoding, or another type of encoding. The main ECC data and the additional ECC data may use a same encoding scheme, such as a BCH scheme. Alternatively, the main ECC data and the additional ECC data may use different encoding schemes. The main ECC data and the additional ECC data may contain a same number of parity bits or may contain a different number of parity bits.

Content data can be stored in sectors (e.g. ECC sectors, such as the ECC page 120 of FIG. 1). The sectors may be organized in a word line as shown in FIGS. 2-3. Although FIGS. 2-3 illustrate organization of content data and additional ECC data in word lines, such as for a NAND flash memory array, other types of memory and other memory architectures may be used.

Error correction may be a function of the number of parity bytes used in the ECC scheme. For example, each word line in FIGS. 2-3 may store 8 kilobytes (KB) of content data, plus parity and header data. Each word line is illustrated as containing four ECC pages, and each ECC page (e.g. the first ECC page 206) may include 230 bytes of main ECC data ("main parity") plus 2 KB of content data. Although an error correction capability of ECC pages could be improved by increasing a number of the main parity bits, such an increase can lead to an increase in size of a memory array (e.g. in NAND flash implementations) that may increase a cost of the memory.

Additional parity can be generated for a chunk, or sub-block, of the ECC page. The additional parity can be generated for all of the content data. Each ECC page can include its original parity (main parity) to cover the 2 kilobytes of data and can also be associated with additional parity (e.g. of 230 bytes) to provide error detection and correction for the left-most (or right-most) half of the ECC page, such as illustrated in FIG. 2. In some embodiments, the additional parity can be added for every quarter of the ECC page as illustrated in FIG. 3, to both halves of the ECC page as described with respect to FIG. 1, or according to one or more other configurations. A determination of which configuration of additional parity to use may be based on how much storage would be used for the additional parities.

The additional parities may be stored in blocks set aside to store additional parity. For example, the additional parity area 162 of FIG. 1 may include one or more blocks of a memory array dedicated to storing additional parity data. Each block may include multiple word lines, each word line containing one or more sectors or ECC pages of additional parity, as illustrated in FIGS. 2-3.

Figure 4:
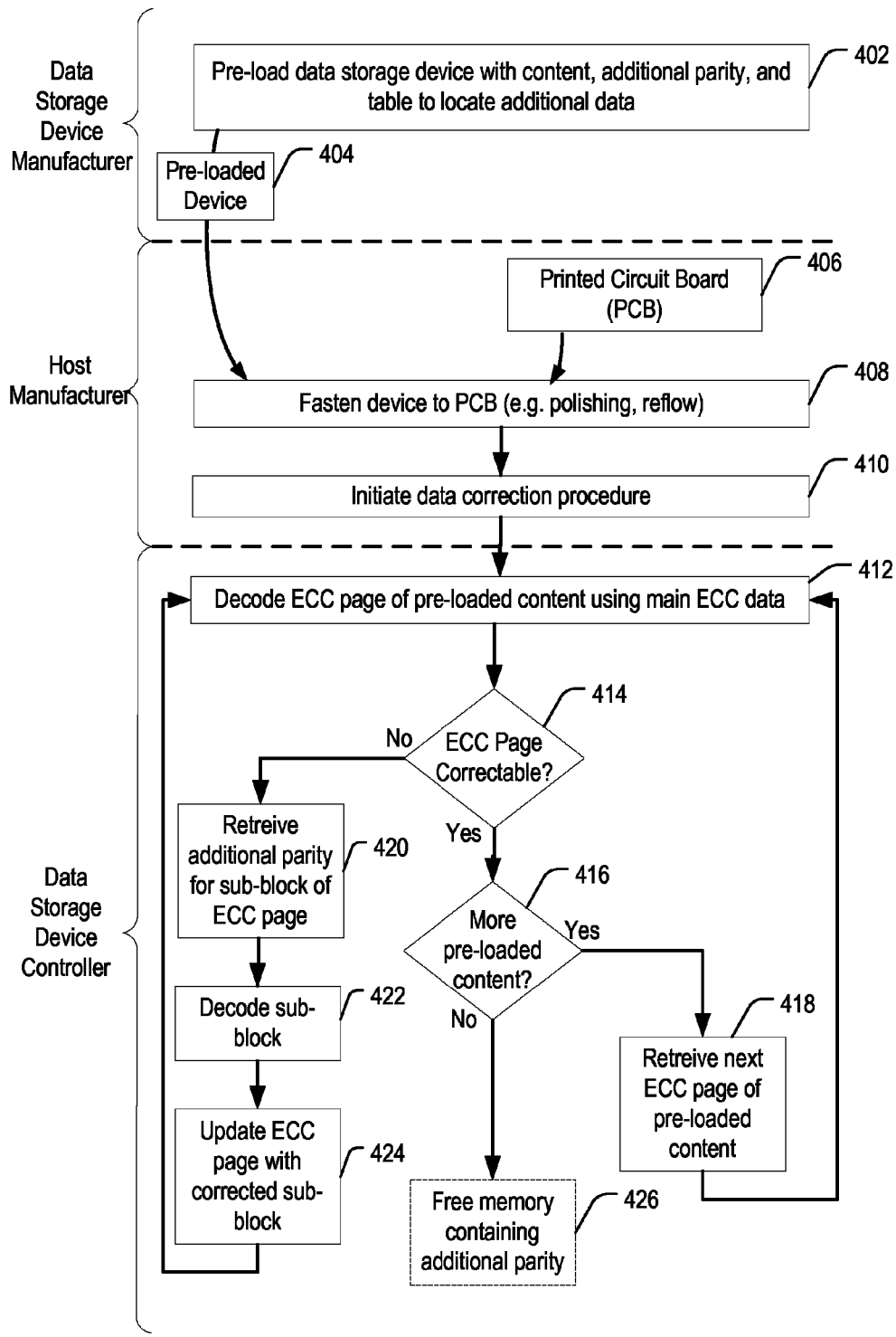
FIG. 4 is a flow diagram of a first illustrative embodiment of a method of providing data recovery using additional error correction coding (ECC) data.

Referring to FIG. 4, a particular embodiment of a method of correcting pre-loaded content in a data storage device is depicted. The method is illustrated as beginning with a data storage device manufacturer pre-loading the data storage device with content 490, additional parity 492, and a table 494 to locate additional data, at 402. For example, the table 494 may be accessible to a controller of the data storage device, such as the controller 110 of FIG. 1, to enable the controller to locate additional parity for a particular ECC page of pre-loaded content. The table 494 may be arranged to be indexed by a word line address and an ECC page indicator to locate an entry including a memory address or location of a corresponding additional ECC data block. The data storage device manufacturer may provide the pre-loaded device 404 to a host manufacturer. For example, the host manufacturer may manufacture portable electronic devices that include embedded data storage devices with pre-loaded content.

The host manufacturer may receive the pre-loaded data storage device 404 and may fasten the device 404 to a printed circuit board 406, at 408. Fastening the device 404 to the printed circuit board 406 may expose the device 404 to one or more data corruption events. To illustrate, fastening the device 404 may include polishing the device 404, reflow, or one or more other events that may corrupt the pre-loaded data. After processing the device 404, such as fastening the device 404 to the PCB 406, the host manufacturer may initiate the data correction procedure, at 410.

The data correction procedure may be performed by a controller of the data storage device, such as the controller 110 of FIG. 1. The data correction procedure may include decoding an ECC page of pre-loaded content using main ECC data, at 412. For example, the controller 110 of FIG. 1 may be configured to start scanning the memory 112 to examine each ECC page of the pre-loaded content area 160 and to decode each ECC page using the main ECC data, such as the main ECC data 124. A determination may be made whether the ECC page is correctable using the main ECC data, at 414. In response to determining that the main ECC data is sufficient to correct the ECC page, at 414, the data correction procedure may include determining whether additional pre-loaded content remains to be analyzed, at 416. When additional pre-loaded content remains to be analyzed, a next ECC page of the pre-loaded content may be retrieved, at 418, and the processing returns to decode the next ECC page of the pre-loaded content using the main ECC data, at 412.

In response to determining that the ECC page is not correctable using main ECC data, at 414, processing may continue with retrieving additional parity for a sub-block of the ECC page, at 420. The sub-block may be individually decoded, at 422, such as illustrated and described with respect to the second ECC operation 152 of FIG. 1. The ECC page may be updated with an error-corrected sub-block, at 424, and processing may return to 412, where the ECC page including the error-corrected sub-block may be decoded using the main ECC data. For example, the decoding may correspond to the third ECC operation 154 of FIG. 1.

Upon determining that all pre-loaded content has been analyzed, at 416, the data correction procedure may include freeing memory that contains additional parity, at 426. For example, memory locations that contain additional ECC data may be freed by updating a file system table to indicate that the memory locations containing the additional data are unused. In an example implementation where the additional ECC data is stored in one or more blocks of a flash memory array, blocks containing the additional ECC data may be erased and marked as available for storing data. Alternatively, the additional parity may not be freed, and may be retained in the memory by the controller to enable additional ECC correction by the data storage device in case of future errors in the pre-loaded content.

Although the data correction procedure is described with respect to correcting pre-loaded content after a data corrupting event occurs during manufacture, in other implementations the data correction procedure may be performed under other circumstances. For example, the data correction procedure may be used to recover user data that has been protected by additional ECC data to provide a higher error correction capability.

The data correction procedure described with respect to FIG. 4 may be a special firmware procedure may be performed by a controller or processor of the memory device. The procedure may include reading each ECC page in a word line and determining if corrupted data content can be corrected with the main parity. If the data content cannot be corrected with the main parity, then the additional parity for that ECC page is retrieved and the corresponding data fields (e.g. one or more sub-blocks protected by the additional parity) will be corrected using the retrieved additional parity. After correcting the one or more sub-blocks using the additional parity, the main parity may then be used to correct the remaining errors.

Alternatively, error detection and correction may be performed "on the fly" as content data is read from the memory instead of during a dedicated data correction procedure. Error correction may therefore be performed incrementally, as opposed to performing data correction for all pre-loaded content data in a single procedure.

Providing additional ECC data enables an increase of the parity for word lines without increasing a size of the memory (i.e. without increasing a size of the main ECC data 124 of FIG. 1 to accommodate additional parity bits). Methods of providing and using the additional ECC data may be used with any ECC technique (e.g. BCH, Reed-Solomon, etc.). Enhanced error correction as described in conjunction with FIGS. 1-4 may be adopted into existing controllers through firmware executed by the controllers and may be used to address corruption of preloaded content data due to soldering or other manufacturing processes.

Figure 5:
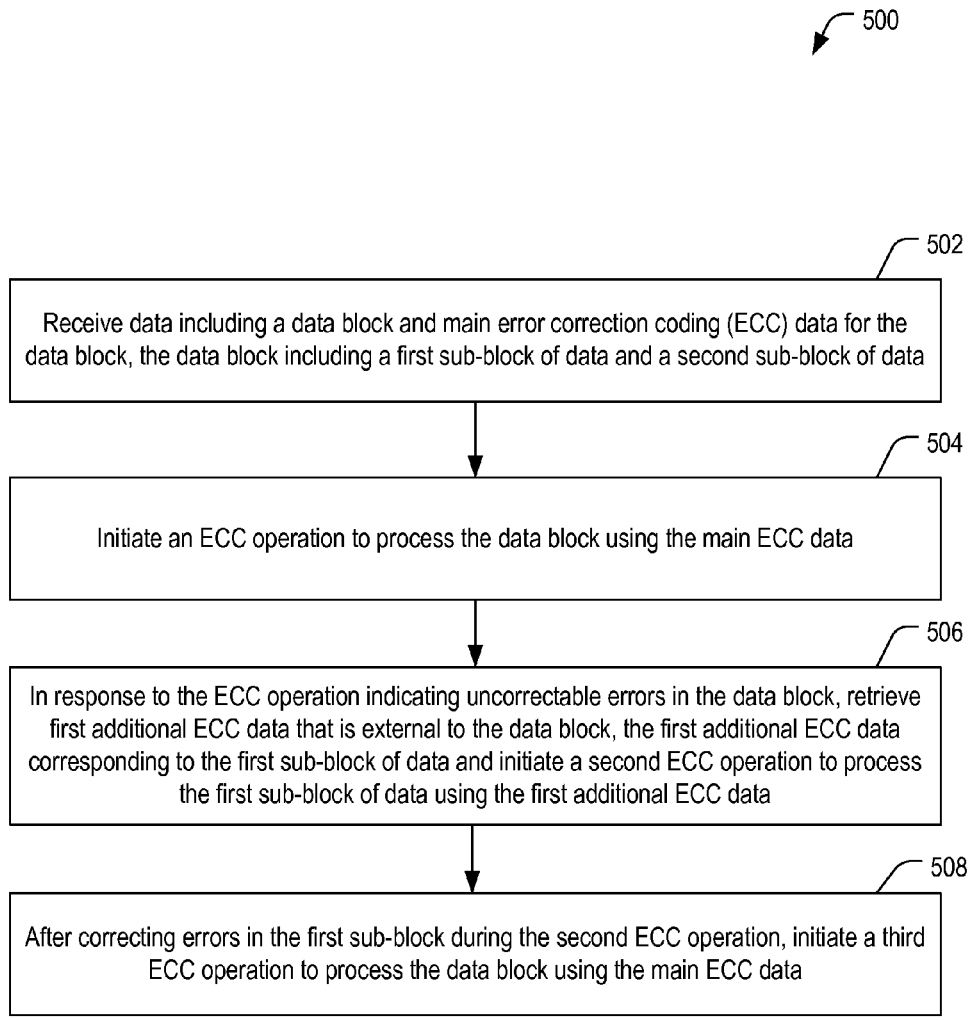
FIG. 5 is a flow diagram of a second illustrative embodiment of a method of providing data recovery using additional error correction coding (ECC) data.

FIG. 5 is a flowchart of a particular embodiment of a method 500 of using additional ECC data. The method 500 may be performed in a controller of a data storage device, such as the controller 110 of FIG. 1. The method 500 includes receiving data including a data block and main ECC data for the data block, at 502. The data block includes multiple sub-blocks (e.g. a first sub-block of data and a second sub-block of data). For example, the controller 110 may send an instruction to the memory 112 including an address of the ECC page 120 for the controller 110 to read the ECC page 120. After sending the instruction, the controller 110 may receive the data block corresponding to the ECC page 120 from the memory 112.

An ECC operation to process the data block using the main ECC data is initiated, at 504. For example, the controller 110 may initiate the first ECC operation 150 of FIG. 1 to process the data block 122 using the main ECC data 124. To illustrate, the controller 110 of FIG. 1 may provide the received data block and main ECC data to an input of the ECC engine 114. The controller 110 may also provide a control signal to the ECC engine 114 to cause the ECC engine 114 to perform an ECC decoding operation using the data block and the main ECC data at the input of the ECC engine 114.

In response to the ECC operation indicating uncorrectable errors in the data block, first additional ECC data that is external to the data block is retrieved. The first additional ECC data corresponds to the first sub-block of data. A second ECC operation is initiated to process the first sub-block of data using the first additional ECC data, at 506. For example, the controller 110 may send a read instruction to the memory 112 including an address of the first additional ECC data 130. After sending the instruction, the controller 110 may receive the first additional ECC data 130 from the memory 112. The controller 110 may provide the first sub-block 126 and the first additional ECC data 130 to an input of the ECC engine 114. The controller 110 may also provide a control signal to the ECC engine 114 to initiate a decoding operation. The decoding operation may correspond to the second ECC operation 152 of FIG. 2.

The data block and the main ECC data may be retrieved as a first ECC page from a first word line of a memory, such as the first ECC page 206 of FIG. 2, and the first additional ECC data may be retrieved from a second word line of the memory as a portion of a second ECC page, such as the second sub-block of the second ECC page 208 of FIG. 2 storing the second additional ECC data 222. The second ECC page may include the first additional ECC data for correcting errors in the first sub-block of the first ECC page and second additional ECC data for correcting errors in the second sub-block of the first ECC page. The second ECC page may further include main parity bits, such as the main ECC data 228 of FIG. 2, for correcting errors in the first additional ECC data and the second additional ECC data.

In some implementations, the controller may determine a location of the first additional ECC data via one or more computations, such as by applying one or more additive or multiplicative factors to a location of the data block. For example, a series of computations may be performed to map the first ECC page 206 or 306 of FIGS. 2-3 to a corresponding sub-block of the second ECC page 208 or 308.

In some implementations, a location of the first additional ECC data may be determined by performing a table lookup operation based on a memory address of the data. The location of the first additional ECC data may be further based on a location of the first sub-block within the data block. To illustrate, the controller 110 may access a table that may be stored in the memory 112 of FIG. 1 or at other memory that is accessible to the controller 110. The controller 110 may provide an address of the data, such as an indicator of a block number and a word line number within the block for use in locating an element of the table. The controller 110 may also provide an indication of a location of the data within the word line, such as an index of an ECC page within the word line. The provided location information may be used to locate a table element that stores a location of the first additional ECC data 130. The location of the first additional ECC data 130 may be retrieved from the table and used to retrieve the first additional ECC data 130 from the memory 112.

The ECC operation and the first sub-block ECC operation can be performed at a common ECC engine of the data storage device, such as the ECC engine 114 of FIG. 1 that performs the first ECC operation 150 and the second ECC operation 152. Alternatively, the ECC operation and the first sub-block ECC operation may be performed at different ECC engines of the data storage device. The main ECC data and the first additional ECC data may have a same number of parity bits. Alternatively, the main ECC data may have a first number of parity bits and the first additional ECC data may have a second number of parity bits, the second number different from the first number.

After correcting errors in the first sub-block during the second ECC operation, at 506, a third ECC operation to process the data block using the main ECC data may be initiated, at 508. For example, the third ECC operation may correspond to the third ECC operation 154 of FIG. 1. In other implementations, all sub-blocks of the data block may be error corrected using additional ECC data and error correction using the main ECC data may be bypassed.

In an implementation such as described in FIG. 4, the data may correspond to pre-loaded content stored in the data storage device. Initiating the ECC operation can be performed during a data correction procedure to correct and re-store the pre-loaded content in the data storage device after a data corrupting event occurs. For example, the data corrupting event may result from a soldering or reflow process to attach the data storage device to a printed circuit board. In other implementations, the data may not correspond to pre-loaded content and may instead include user data that is protected by additional ECC data to provide a higher error correction capability.

Figure 6:
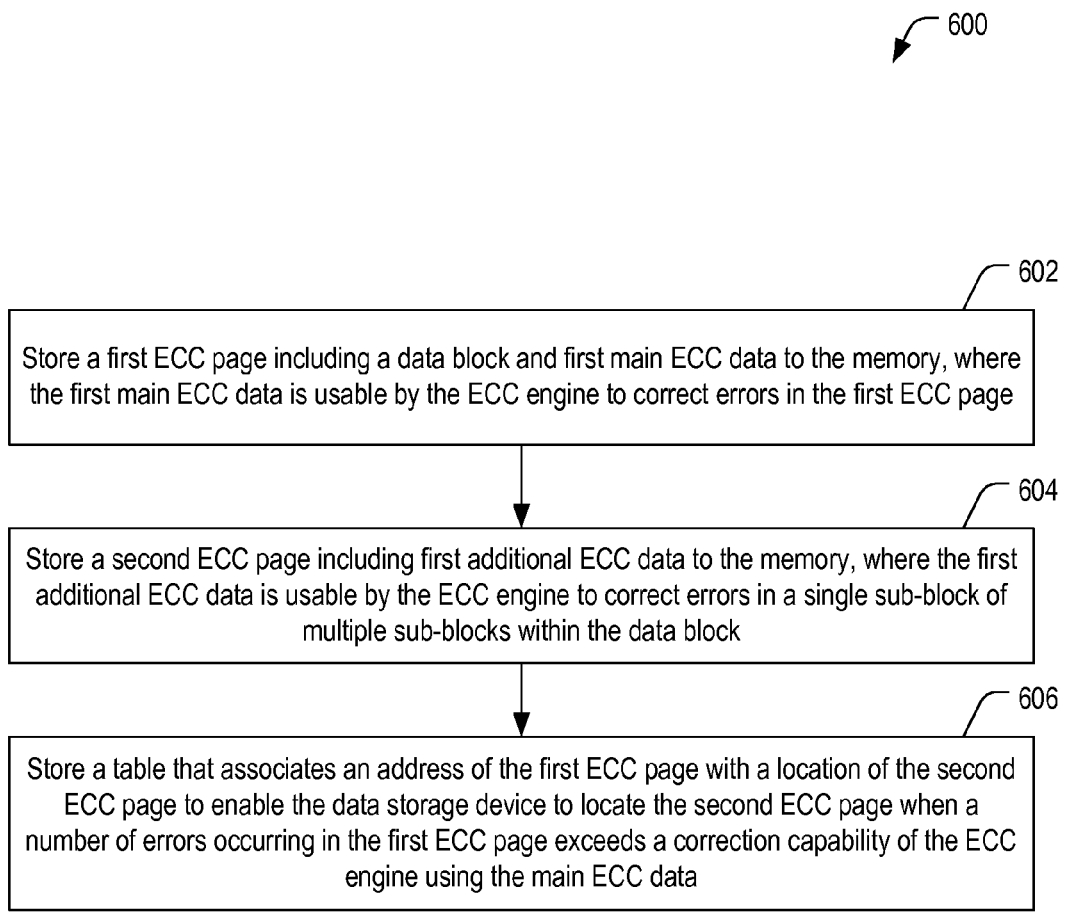
FIG. 6 is a flow diagram of a third illustrative embodiment of a method of providing data recovery using additional error correction coding (ECC) data.

FIG. 6 illustrates a particular embodiment of a method 600 of providing additional ECC data. The method 600 may be performed in a data storage device including a memory and an error correction coding (ECC) engine, such as the memory 112 and the ECC engine 114 of the data storage device 102 of FIG. 1. The method 600 includes storing a first ECC page including a data block and first main ECC data to the memory, at 602. The first main ECC data is usable by the ECC engine to correct errors in the first ECC page. For example, the first ECC page may be the first ECC page 206 of FIG. 2.

A second ECC page including first additional ECC data is stored to the memory, at 604. The first additional ECC data is usable by the ECC engine to correct errors in a single sub-block of multiple sub-blocks within the data block. For example, the second ECC page may be the second ECC page 208 of FIG. 2.

A table that associates an address of the first ECC page with a location of the second ECC page may be stored, at 606. The table may be stored to enable the data storage device to locate the second ECC page when a number of errors occurring in the first ECC page exceeds a correction capability of the ECC engine using the main ECC data.

In an illustrative implementation, the method 600 may be controlled by the data storage device manufacturer of FIG. 4 to form the pre-loaded device 404. The first ECC page may be part of pre-loaded content stored to a first portion of the memory, and the second ECC page may be part of additional parity stored to a second portion of the memory. The pre-loaded content and the additional parity may be stored to the memory prior to raising a temperature of the data storage device during a soldering or reflow process, such as described with respect to the host manufacturing process of FIG. 4.

Although various components depicted herein are illustrated as block components and described in general terms, such components may include one or more microprocessors, state machines, or other circuits configured to enable the data storage device 102 of FIG. 1 to perform the particular functions attributed to such components. For example, the controller 110 of FIG. 1 may represent physical components, such as hardware controllers, state machines, logic circuits, or other structures, to enable the data storage device 102 to perform sub-block data correction using the additional ECC data.

The controller 110 may include dedicated hardware (i.e. circuitry) to implement error correction using additional ECC data. Alternatively, the controller 110 may implement error correction using additional ECC data using a microprocessor or microcontroller programmed to determine when to retrieve and use additional ECC data to decode sub-blocks of an ECC page. In a particular embodiment, the controller 110 includes executable instructions that are executed by a processor and the instructions are stored at the memory 112. Alternatively, or in addition, executable instructions that are executed by a processor that may be included in the controller 110 may be stored at a separate memory location that is not part of the memory 112, such as at a read-only memory (ROM).

In a particular embodiment, the data storage device 102 may be a portable device configured to be selectively coupled to one or more external devices. However, in other embodiments, the data storage device 102 may be attached or embedded within one or more host devices, such as within a housing of a portable communication device. For example, the data storage device 102 may be within a packaged apparatus such as a wireless telephone, personal digital assistant (PDA), gaming device or console, portable navigation device, or other device that uses internal non-volatile memory. In a particular embodiment, the data storage device 102 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a controller of a data storage device, performing:
      receiving data including a data block and main error correction coding (ECC) data for the data block, the data block including a first sub-block of data and a second sub-block of data;
      initiating an ECC operation to process the data block using the main ECC data; and
      in response to the ECC operation indicating uncorrectable errors in the data block, retrieving first additional ECC data that is external to the data block, the first additional ECC data corresponding to the first sub-block of data and initiating a second ECC operation to process the first sub-block of data using the first additional ECC data.

2. The method of claim 1, further comprising, after correcting errors in the first sub-block during the second ECC operation, initiating a third ECC operation to process the data block using the main ECC data.

3. The method of claim 1, wherein the data corresponds to pre-loaded content stored in the data storage device and wherein initiating the ECC operation is performed during a data correction procedure to correct and re-store the pre-loaded content in the data storage device after a data corrupting event occurs.

4. The method of claim 3, wherein the data corrupting event results from a soldering or reflow process to attach the data storage device to a printed circuit board.

5. The method of claim 1, wherein the data block and the main ECC data are retrieved as a first ECC page from a first word line of a memory and wherein the first additional ECC data is retrieved from a second word line of the memory as a portion of a second ECC page.

6. The method of claim 5, wherein the second ECC page includes the first additional ECC data for correcting errors in the first sub-block of the first ECC page and second additional ECC data for correcting errors in the second sub-block of the first ECC page.

7. The method of claim 6, wherein the second ECC page further includes main parity bits for correcting errors in the first additional ECC data and the second additional ECC data.

8. The method of claim 1, wherein the main ECC data and the first additional ECC data have a same number of parity bits.

9. The method of claim 1, wherein the main ECC data has a first number of parity bits and the first additional ECC data has a second number of parity bits, the second number different from the first number.

10. The method of claim 1, wherein the ECC operation and the second ECC operation are performed at a common ECC engine of the data storage device.

11. The method of claim 1, further comprising performing a table lookup operation to determine a location of the first additional ECC data based on a memory address of the data.

12. The method of claim 11, wherein the location of the first additional ECC data is further based on a location of the first sub-block within the data block.

13. A data storage device comprising:
   a memory device; and
   a controller coupled to the memory, wherein the controller comprises an error correction coding (ECC) engine,
      wherein the controller is configured to initiate a first ECC operation at the ECC engine to process a data block using main ECC data for the data block, and wherein the controller is configured to retrieve first additional ECC data that is external to the data block from the memory and initiate a second ECC operation to process a first sub-block of the data block using the first additional ECC data in response to the first ECC operation indicating uncorrectable errors in the data block.

14. The data storage device of claim 13, wherein data including the data block and the main ECC data corresponds to pre-loaded content stored in the memory and wherein initiating the ECC operation is performed during a data correction procedure to correct and re-store the pre-loaded content in the memory after a data corrupting event occurs.

15. The data storage device of claim 14, wherein the data corrupting event results from a soldering or reflow process to attach the data storage device to a printed circuit board.

16. The data storage device of claim 14, wherein the controller is configured to maintain the first additional ECC data in the memory after completing the data correction procedure.

17. The data storage device of claim 14, wherein the controller is configured to free a portion of memory that stores the first additional ECC data after completing the data correction procedure.

18. The data storage device of claim 14, wherein the controller is configured to maintain the first additional ECC data after completing the data correction procedure.

19. The data storage device of claim 14, wherein the controller is configured to retrieve the data block and the main ECC data from a first ECC page from a first word line of the memory and to retrieve the first additional ECC data from a second word line of the memory as a portion of a second ECC page.

20. The data storage device of claim 19, wherein the second ECC page includes the first additional ECC data for correcting errors in the first sub-block of the first ECC page and second additional ECC data for correcting errors in a second sub-block of the first ECC page.

21. The data storage device of claim 20, wherein the second ECC page further includes main parity bits for correcting errors in the first additional ECC data and the second additional ECC data.

22. The data storage device of claim 13, wherein the main ECC data and the first additional ECC data have a same number of parity bits.

23. The data storage device of claim 13, wherein the main ECC data has a first number of parity bits and the first additional ECC data has a second number of parity bits, the second number different from the first number.

24. The data storage device of claim 13, wherein the controller is configured to perform a table lookup operation to determine a location of the first additional ECC data based on a memory address of the data block.

25. The data storage device of claim 24, wherein the location of the first additional ECC data is further based on a location of the first sub-block within the data block.

26. The data storage device of claim 12, wherein the memory is a flash memory.

27. The data storage device of claim 26, wherein the data storage device is one of:
a flash memory card;
a universal serial bus (USB) flash drive;
a solid state drive (SSD); and
an embedded flash memory.

28. The data storage device of claim 13, wherein the memory is a three-dimensional (3D) memory.

29. The data storage device of claim 13, wherein the data storage device is configured to be coupled to a host device as embedded memory.

* * * * *

UNITED STATES PATENT AND TRADEMARK OFFICE
CERTIFICATE OF CORRECTION

| | |
|---|---|
| PATENT NO. | : 8,484,542 B2 |
| APPLICATION NO. | : 13/023147 |
| DATED | : July 9, 2013 |
| INVENTOR(S) | : Manuel Antonio d'Abreu et al. |

It is certified that error appears in the above-identified patent and that said Letters Patent is hereby corrected as shown below:

In the Claims

Column 14, Claim 26, Line 22, "26. The data storage device of claim 12, wherein the" should read --26. The data storage device of claim 13, wherein the--.

Signed and Sealed this
Twelfth Day of August, 2014

Michelle K. Lee
*Deputy Director of the United States Patent and Trademark Office*